US012663659B2

(12) United States Patent
Kurokawa et al.

(10) Patent No.: US 12,663,659 B2
(45) Date of Patent: Jun. 23, 2026

(54) OPTICAL MODULE

(71) Applicant: SUMITOMO ELECTRIC INDUSTRIES, LTD., Osaka (JP)

(72) Inventors: Munetaka Kurokawa, Osaka (JP); Hiroshi Hara, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 315 days.

(21) Appl. No.: 18/450,489

(22) Filed: Aug. 16, 2023

(65) Prior Publication Data

US 2024/0069354 A1    Feb. 29, 2024

(30) Foreign Application Priority Data

Aug. 23, 2022    (JP) ................................. 2022-132465

(51) Int. Cl.
G02B 27/14       (2006.01)
G02B 27/10       (2006.01)

(52) U.S. Cl.
CPC ....... G02B 27/145 (2013.01); G02B 27/1073 (2013.01)

(58) Field of Classification Search
CPC .......................... G02B 27/145; G02B 27/1073
USPC ....................................................... 359/629
See application file for complete search history.

(56) References Cited

U.S. PATENT DOCUMENTS 3,850,515 A * 11/1974 Burch ................ G03B 21/2033
                                                    353/122
2008/0055589 A1    3/2008 Asami et al.
2021/0320719 A1    10/2021 Nagashima et al.

FOREIGN PATENT DOCUMENTS

JP        2008-051698 A    3/2008
JP        2018-124429 A    8/2018
WO        2020/138337 A1   7/2020

OTHER PUBLICATIONS

Munetaka Kurokawa et al., "High Optical Output Power and High-responsivity IC-TROSA for 800 Gbps applications", 2021 European Conference on Optical Communication (ECOC), URL: DOI: 10.1109/ECOC52684.2021.9606101, Sep. 13, 2021, ppp. 1-3.

* cited by examiner

*Primary Examiner* — Bumsuk Won
*Assistant Examiner* — Mitchell T Oestreich
(74) *Attorney, Agent, or Firm* — McDonald Hopkins LLC

(57) ABSTRACT

An optical module according to one embodiment includes: a beam splitter having a first surface, a second surface facing the first surface, a third surface intersecting with the first surface, a fourth surface facing the third surface, and an inner surface formed within a region defined by the first surface, the second surface, the third surface, and the fourth surface; and a light receiving unit arranged at a position facing the third surface of the beam splitter. The beam splitter splits first incident light incident from the first surface into first split light transmitted through the inner surface and emitted from the second surface and second split light reflected on the inner surface and emitted from the third surface. The optical module includes a light absorbing/reflecting unit provided on the fourth surface.

7 Claims, 7 Drawing Sheets

OPTICAL MODULE

CROSS-REFERENCE TO RELATED APPLICATION

This application claims priority from Japanese Patent Application No. 2022-132465, filed on Aug. 23, 2022, the entire subject matter of which is incorporated herein by reference.

TECHNICAL FIELD

The present disclosure relates to optical modules.

BACKGROUND

Japanese Unexamined Patent Publication No. 2008-51698 describes a bidirectional optical module. The bidirectional optical module includes a light emitting element, a light receiving element receiving light emitted from an optical fiber, and a coupling/splitting element guiding the light emitted from the optical fiber to the light receiving element. Furthermore, the bidirectional optical module includes a stray light blocking member arranged between the coupling/splitting element and the light receiving element. The stray light blocking member has an opening. The stray light blocking member shields stray light not passing through the opening. The light passing through the opening of the stray light blocking member is coupled to a light receiving surface of the light receiving element.

In the stray light blocking member described above, if the position of the stray light blocking member is not appropriate, the stray light cannot be suppressed reliably. Therefore, in order to block the stray light and transmit light other than the stray light, it may be necessary to perform alignment work of the position of the stray light blocking member with high accuracy. Therefore, there is a phenomenon that it is difficult to perform the alignment work, and the alignment work cannot be performed efficiently.

SUMMARY

The object of the present disclosure is to provide an optical module capable of suppressing stray light and efficiently performing alignment work.

An optical module according to the present disclosure includes a beam splitter having a first surface, a second surface facing the first surface, a third surface intersecting with the first surface, a fourth surface facing the third surface, and an inner surface formed within a region defined by the first surface, the second surface, the third surface, and the fourth surface, and a light receiving unit arranged at a position facing the third surface of the beam splitter. The beam splitter splits first incident light incident from the first surface into first split light transmitted through the inner surface and emitted from the second surface and second split light reflected on the inner surface and emitted from the third surface. The optical module includes a light absorbing/reflecting unit provided on the fourth surface.

According to the present disclosure, stray light can be suppressed, and alignment work can be performed efficiently.

DETAILED DESCRIPTION

Description of Embodiment of Present Disclosure

Figure 1:
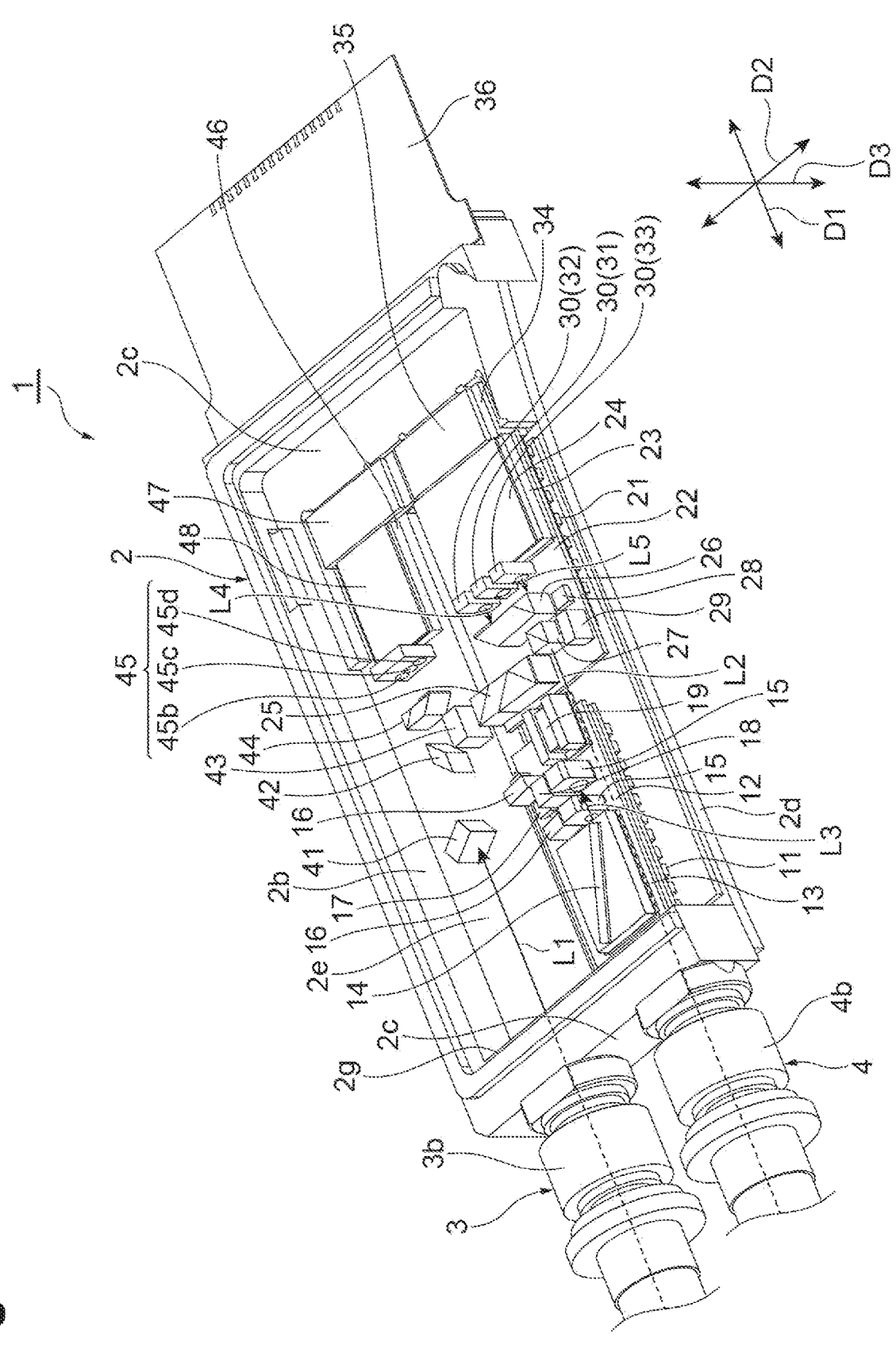
FIG. 1 is a perspective view illustrating an internal structure of an optical module according to an embodiment.

First, contents of embodiments of an optical module according to the present disclosure will be listed and described. (1) An optical module according to an embodiment includes a beam splitter having a first surface, a second surface facing the first surface, a third surface intersecting with the first surface, a fourth surface facing the third surface, and an inner surface formed within a region defined by the first surface, the second surface, the third surface, and the fourth surface; and a light receiving unit arranged at a position facing the third surface of the beam splitter. The beam splitter splits first incident light incident from the first surface into first split light transmitted through the inner surface and emitted from the second surface and second split light reflected on the inner surface and emitted from the third surface. The optical module includes the light absorbing/reflecting unit provided on the fourth surface.

In this optical module, the beam splitter has the first surface, the second surface, the third surface, the fourth surface, and the inner surface, and the inner surface is formed within the region defined by the first surface, the second surface, the third surface, and the fourth surface. The beam splitter splits the first incident light incident from the first surface into the first split light and the second split light. The first split light is emitted from the second surface, and the second split light is emitted from the third surface. The optical module includes a light receiving unit arranged at a position facing the third surface and a light absorbing/reflecting unit provided on the fourth surface. Therefore, even if stray light reaches the fourth surface of the beam splitter, the stray light can be absorbed or reflected by the light absorbing/reflecting unit provided on the fourth surface. In this optical module, since it is sufficient to provide the light absorbing/reflecting unit on the fourth surface of the beam splitter, the alignment work can be performed efficiently.

(2) In (1) above, the light absorbing/reflecting unit may be coated with a light absorbing film or a light reflecting film. In this case, the light absorbing/reflecting unit can be easily produced.

(3) In the above (1) or (2), the optical module further includes an optical modulation element, the optical modulation element may be input with continuous light to an input port, and the first incident light may be output from an output port as modulated signal light.

(4) In (3) above, the light absorbing/reflecting unit may absorb or reflect the continuous light.

(5) In (3) or (4) above, the optical module may further include another beam splitter having a fifth surface, a sixth surface facing the fifth surface, a seventh surface intersecting with the fifth surface, an eighth surface facing the seventh surface, and an inner surface formed within a region defined by the fifth surface, the sixth surface, the seventh surface, and the eighth surface. The other beam splitter may be connected to the fourth surface of the beam splitter via the light absorbing/reflecting unit at the eighth surface and may split the second incident light incident from the fifth surface into third split light transmitted through the inner surface and emitted from the sixth surface and fourth split light reflected on the inner surface and emitted from the seventh surface.

(6) The optical module according to another embodiment has an optical modulation element having an input port input with continuous light and an output port outputting modulated signal light; a beam splitter having a first surface, a second surface facing the first surface, a third surface intersecting with the first surface, a fourth surface facing the third surface, and an inner surface formed within a region defined by the first surface, the second surface, the third surface, and the fourth surface and splitting the modulated signal light incident from the first surface into first split light transmitted through the inner surface and emitted from the second surface and second split light reflected on the inner surface and emitted from the third surface; a light receiving unit arranged at a position facing the third surface of the beam splitter and receiving the second split light; and a light absorbing/reflecting unit provided on the fourth surface and absorbing or reflecting the continuous light.

Details of Embodiment of Present Disclosure

A specific example of an optical module according to an embodiment of the present disclosure will be described below with reference to the drawings. It is noted that the present invention is not limited to the following examples, but is intended to include all modifications indicated in the scope of the claims and within the scope of equivalents to the scope of the claims. In the description of the drawings, the same or corresponding elements are denoted by the same reference numerals, and overlapping descriptions are omitted as appropriate. In addition, the drawings may be partially simplified or exaggerated for easy understanding, and the dimensional ratios and the like are not limited to those described in the drawings.

FIG. 1 is a perspective view illustrating an optical module 1 as an example. As illustrated in FIG. 1, the optical module 1 includes a package 2 having rectangular parallelepiped shape and an input assembly 3 and an output assembly 4 extending from the package 2. Each of the input assembly 3 and the output assembly 4 presents a cylindrical shape. The package 2 includes a first side wall 2b extending along a first direction D1, a pair of second side walls 2c extending along a second direction D2 intersecting with the first direction D1, and a bottom wall 2d with components of the optical module 1 mounted thereon. The first direction D1 is a longitudinal direction of the optical module 1, and the second direction D2 is a width direction of the optical module 1.

The first side wall 2b extends in both the first direction D1 and a third direction D3. The third direction D3 is a direction intersecting with both the first direction D1 and the second direction D2 and corresponds to a height direction of the optical module 1. The pair of second side walls 2c are aligned along the first direction D1, and each second side wall 2c extends in both the second direction D2 and the third direction D3. The bottom wall 2d extends in both the first direction D1 and the second direction D2 at one end of the first side wall 2b and the second side wall 2c in the third direction D3. The pair of first side walls 2b and the pair of second side walls 2c constitute a frame body 2g of the package 2 having a frame shape when viewed from the third direction D3. The package 2 has a bottom wall 2e.

The input assembly 3 and the output assembly 4 extend along the first direction D1 from one of the pair of second side walls 2c. The input assembly 3 and the output assembly 4 are aligned along the second direction D2. The input assembly 3 is a portion for inputting input light L1 from the outside of the optical module 1 into the inside of the optical module 1. The output assembly 4 is a portion for outputting output light L2 from the inside of the optical module 1 to the outside of the optical module 1. The input assembly 3 has a tubular sleeve 3b, and the output assembly 4 has a tubular sleeve 4b.

The optical module 1 includes a first temperature control device 11 mounted on the bottom wall 2d, the variable wavelength light source base 12 mounted on the first temperature control device 11, a variable wavelength light source carrier 13 mounted on the variable wavelength light source base 12, and a variable wavelength light source element 14 mounted on the variable wavelength light source carrier 13. The optical module 1 further includes a plurality of lenses 15 mounted on the variable wavelength light source base 12, a plurality of wavelength control monitor elements 16, a thermistor 17, an etalon filter 18, and an isolator 19. Light L3 output from the variable wavelength light source element 14 is input to the plurality of lenses 15, and the light L3 transmitted through the plurality of lenses 15 is input to the isolator 19. The isolator 19 emits the light L3 to the side opposite to the variable wavelength light source element 14.

The optical module 1 includes a second temperature control device 21, an optical modulation element base 22 mounted on the second temperature control device 21, an optical modulation element carrier 23 mounted on the optical modulation element base 22, and an optical modulation element 24 mounted on the optical modulation element carrier 23. For example, the optical modulation element 24 is made of either indium phosphide (InP) or silicon (Si). Further, the optical module 1 includes a filter block 25 mounted on the optical modulation element base 22, a polarization multiplexing filter 26, a monitor tap filter 27 (beam splitter), a thermistor 28, a modulated output light intensity monitor light receiving element (light receiving unit) 29, and a plurality of lenses 30.

The optical module 1 includes a heat sink 34 provided at a position on the side opposite to the lens 30 when viewed from the optical modulation element 24, a driver IC 35 mounted on the heat sink 34, and a flexible printed circuit (FPC) 36 extending to the side opposite to the optical modulation element 24 when viewed from the driver IC 35. The driver IC 35 is electrically connected to each of the optical modulation element 24 and the FPC 36.

The optical modulation element 24 has an input port, a first output port, and a second output port on a portion of the sides facing the plurality of lenses 30. The plurality of lenses 30 includes a first lens 31 facing an input port of the optical modulation element 24, a second lens 32 facing a first output port of the optical modulation element 24, and a third lens 33 facing a second output port of the optical modulation element 24. Light L4, which is modulated signal light emitted from the first output port of the optical modulation element 24, passes through the second lens 32.

The light L4 transmitted through the second lens 32 is reflected by the polarization multiplexing filter 26 in the second direction D2. Light L5, which is modulated signal light emitted from the second output port of the optical modulation element 24, passes through the third lens 33 to be input on the polarization multiplexing filter 26. The polarization multiplexing filter 26 reflects the light L4 reflected in the second direction D2 in the first direction D1 and transmits the light L5 in the first direction D1. That is, the polarization multiplexing filter 26 outputs the light L4 and the light L5 as the output light L2 in the first direction D1. The monitor tap filter 27 outputs a portion of the output light L2 to the output assembly 4 and reflects a remaining portion of the output light L2 (second split light L22) in the second direction D2. The second split light L22 reflected by the monitor tap filter 27 is received by the modulated output light intensity monitor light receiving element 29. The monitor tap filter 27 will be detailed later.

Figure 2:
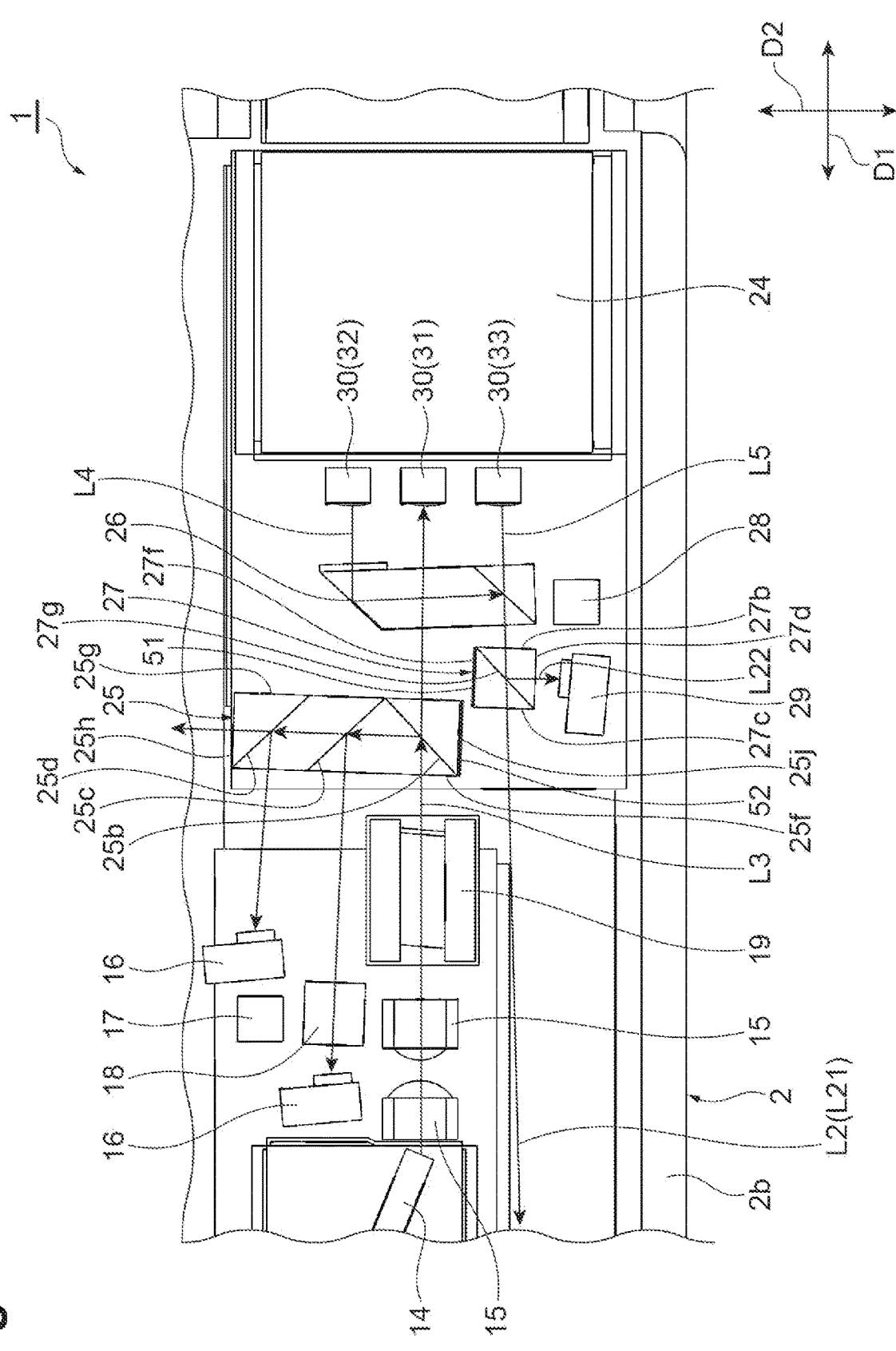
FIG. 2 is an enlarged plan view of a beam splitter and a light receiving unit of the optical module in FIG. 1.

FIG. 2 is an enlarged plan view of the periphery of the filter block 25 inside the optical module 1. As illustrated in FIGS. 1 and 2, the filter block 25 transmits and reflects the light L3 transmitted through the isolator 19. The filter block 25 has a first reflecting/transmitting surface 25b, a second reflecting/transmitting surface 25c, and a third reflecting/transmitting surface 25d formed inside the filter block 25. The first reflecting/transmitting surface 25b, the second reflecting/transmitting surface 25c, and the third reflecting/transmitting surface 25d are aligned in this order along the second direction D2. The orientation of the first reflecting/transmitting surface 25b and the orientation of the second reflecting/transmitting surface 25c are different from each other, for example, perpendicular to each other. For example, the orientation of the second reflecting/transmitting surface 25c and the orientation of the third reflecting/transmitting surface 25d are the same (parallel) to each other.

Further, the filter block 25 has a first surface 25f facing the isolator 19, a second surface 25g facing the polarization multiplexing filter 26, a third surface 25h facing the side opposite to the monitor tap filter 27, and a fourth surface 25j facing the monitor tap filter 27 side. The first reflecting/transmitting surface 25b, the second reflecting/transmitting surface 25c, and the third reflecting/transmitting surface 25d are formed within a region defined by the first surface 25f, the second surface 25g, the third surface 25h, and the fourth surface 25j.

The filter block 25 transmits a portion of the light L3 through the first reflecting/transmitting surface 25b to be input on the first lens 31. The first lens 31 inputs the light L3 to the input port of the optical modulation element 24. The light L3 is continuous light. The filter block 25 reflects the rest of the light L3 in the second direction D2 at the first reflecting/transmitting surface 25b. The light L3 reflected in the second direction D2 by the first reflecting/transmitting surface 25b is incident on the second reflecting/transmitting surface 25c.

The second reflecting/transmitting surface 25c reflects a portion of the light L3 in the first direction D1 to guide the portion of the light L3 to the etalon filter 18 and the wavelength control monitor element 16, and transmits the rest of the light L3 in the second direction D2. The light L3 transmitted through the second reflecting/transmitting surface 25c is incident on the third reflecting/transmitting surface 25d. The third reflecting/transmitting surface 25d reflects a portion of the light L3 in the first direction D1 to guide the portion of the light L3 to the wavelength control monitor element 16, and transmits the rest of the light L3 in the second direction D2.

As illustrated in FIGS. 1 and 2, the optical module 1 includes a first optical path adjusting filter 41, a mirror 42, a second optical path adjusting filter 43, a polarization separating filter 44, a lens 45 having a first lens portion 45b, a second lens portion 45c, and a third lens portion 45d, and a demodulation element carrier 46. The first optical path adjusting filter 41, the mirror 42, the second optical path adjusting filter 43, the polarization separating filter 44, the lens 45, and the demodulation element carrier 46 are mounted on the bottom wall 2e of the package 2.

The optical module 1 has a trans impedance amplifier (TIA) 47 mounted on the heat sink 34 and a demodulation element 48 mounted on the demodulation element carrier 46. The demodulation element 48 is input with the light incident on each of the first lens portion 45b, the second lens portion 45c, and the third lens portion 45d of the lens 45. The input light L1 input from the input assembly 3 into the optical module 1 passes through the first optical path adjusting filter 41 to be incident on the polarization separating filter 44.

The portion of the input light L1 incident on the polarization separating filter 44 passes through the polarization separating filter 44 to be incident on the first lens portion 45b of the lens 45. The remaining portion of the input light L1 incident on the polarization separating filter 44 is reflected twice by the polarization separating filter 44 to be incident on the third lens portion 45d of the lens 45. The light L3 transmitted through the filter block 25 (third reflecting/transmitting surface 25d) in the second direction D2 is incident on the second optical path adjusting filter 43 and the mirror 42. The light L3 is reflected by the mirror 42 in the first direction D1 to be incident on the second lens portion 45c of the lens 45.

Next, the detailed structure of the monitor tap filter 27 will be described. The monitor tap filter 27 is a beam splitter splitting the output light L2. The monitor tap filter 27 has a first surface 27b, a second surface 27c facing the first surface 27b, a third surface 27d intersecting with the first surface 27b, and a fourth surface 27f facing the third surface 27d. Additionally, the monitor tap filter 27 has an inner surface 27g formed within the region defined by the first surface 27b, the second surface 27c, the third surface 27d, and the fourth surface 27f.

The first surface 27b faces the polarization multiplexing filter 26, and the second surface 27c faces the side opposite to the first surface 27b. The third surface 27d faces the modulated output light intensity monitor light receiving element 29, and the fourth surface 27f faces the filter block 25 side (side opposite to the third surface 27d). The monitor tap filter 27 splits the output light L2, which is first incident light incident from the first surface 27b into first split light L21 transmitted through the inner surface 27g to be output from the second surface 27c, and second split light L22 reflected on the inner surface 27g and emitted from the third surface 27d. The first split light L21 is output to the output assembly 4, and the second split light L22 is output to the modulated output light intensity monitor light receiving element 29.

The modulated output light intensity monitor light receiving element 29 is arranged at the position facing the third surface 27d of the monitor tap filter 27. The optical module 1 includes a light absorbing/reflecting unit 51 provided on the fourth surface 27f. The light absorbing/reflecting unit 51 is coated with a light absorbing film or a light reflecting film. For example, transmittance of light (P polarized wave and S polarized wave) in the light absorbing/reflecting unit 51 is less than 0.1%. For example, reflectance of the light (P polarized wave and S polarized wave) in the light absorbing/reflecting unit 51 is less than 2%. The light absorbing/reflecting unit 51 may be coated with a dielectric multilayer film or a metal film (Cr coat). Furthermore, the optical module 1 includes a light absorbing/reflecting unit 52 on the fourth surface 25j of the filter block 25. For example, the configuration of the light absorbing/reflecting unit 52 is similar to the configuration of the light absorbing/reflecting unit 51.

Next, functions and effects obtained from the optical module 1 according to this embodiment will be described. In the optical module 1, the monitor tap filter 27 includes the first surface 27b, the second surface 27c, the third surface 27d, the fourth surface 27f, and the inner surface 27g, and the inner surface 27g is formed within the region defined by the first surface 27b, the second surface 27c, the third surface 27d, and the fourth surface 27f. The monitor tap filter 27 splits the output light L2 incident from the first surface 27b into the first split light L21 and the second split light L22. The first split light L21 is emitted from the second surface 27c, and the second split light L22 is emitted from the third surface 27d. The optical module 1 includes the modulated output light intensity monitor light receiving element 29 arranged at the position facing the third surface 27d and the light absorbing/reflecting unit 51 provided on the fourth surface 27f.

Therefore, even if the stray light reaches the fourth surface 27f of the monitor tap filter 27, the stray light can be absorbed or reflected by the light absorbing/reflecting unit 51 provided on the fourth surface 27f. It is considered that the stray light that can occur in the optical module 1 can be light that reaches one of the surfaces of the filter block 25 and the monitor tap filter 27 and is transmitted or reflected by the surface. In the optical module 1, since the light absorbing/reflecting unit 51 may be provided on the fourth surface 27f of the monitor tap filter 27, the alignment work can be performed efficiently. Furthermore, since the optical module 1 includes the light absorbing/reflecting unit 52 on the fourth surface 25j of the filter block 25, it is possible to more reliably suppress the stray light from reaching the modulated output light intensity monitor light receiving element 29.

As described above, the light absorbing/reflecting unit 51 may be coated with the light absorbing film or the light reflecting film. In this case, the light absorbing/reflecting unit 51 can be easily manufactured. The same applies to the light absorbing/reflecting unit 52.

As described above, the optical module 1 may further include the optical modulation element 24. The optical modulation element 24 is input with continuous light (light L3) at the input port thereof, outputs the first incident light from the output port as modulated signal light (light L4 and light L5) and may be incident with the first incident light as output light L2 at the first surface 27b. The light absorbing/reflecting unit 51 may optically absorb or optically reflect the continuous light.

Figure 3:
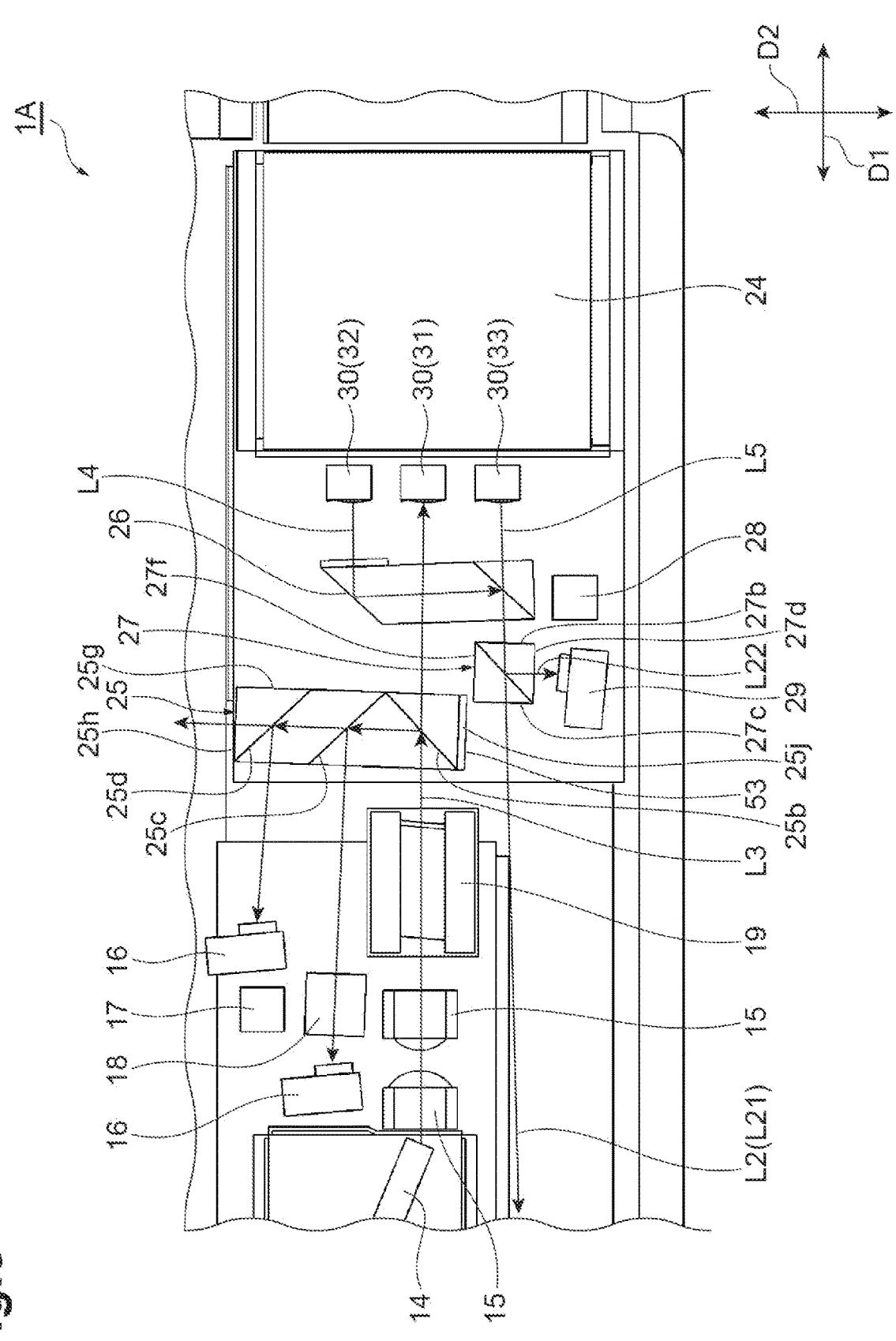
FIG. 3 is a plan view illustrating a modified example of the beam splitter in FIG. 2.

Next, an optical module 1A according to a modified example will be described with reference to FIG. 3. The portion of the configuration of the optical module 1A is the same as the portion of the configuration of the optical module 1 described above. Therefore, in the following description, components of the description overlapping with the description of the optical module 1 are denoted by the same reference numerals, and the overlapping descriptions will be omitted as appropriate. The optical module 1 includes a film forming component 53 attached to the fourth surface 25j of the filter block 25 instead of the light absorbing/reflecting unit 52. The film forming component 53 is coated with the light absorbing film or the light reflecting film, similarly to the light absorbing/reflecting unit 51 described above. By attaching the film forming component 53 to the fourth surface 25j of the filter block 25, it is possible to easily take measures against the stray light to the modulated output light intensity monitor light receiving element 29.

Figure 4:
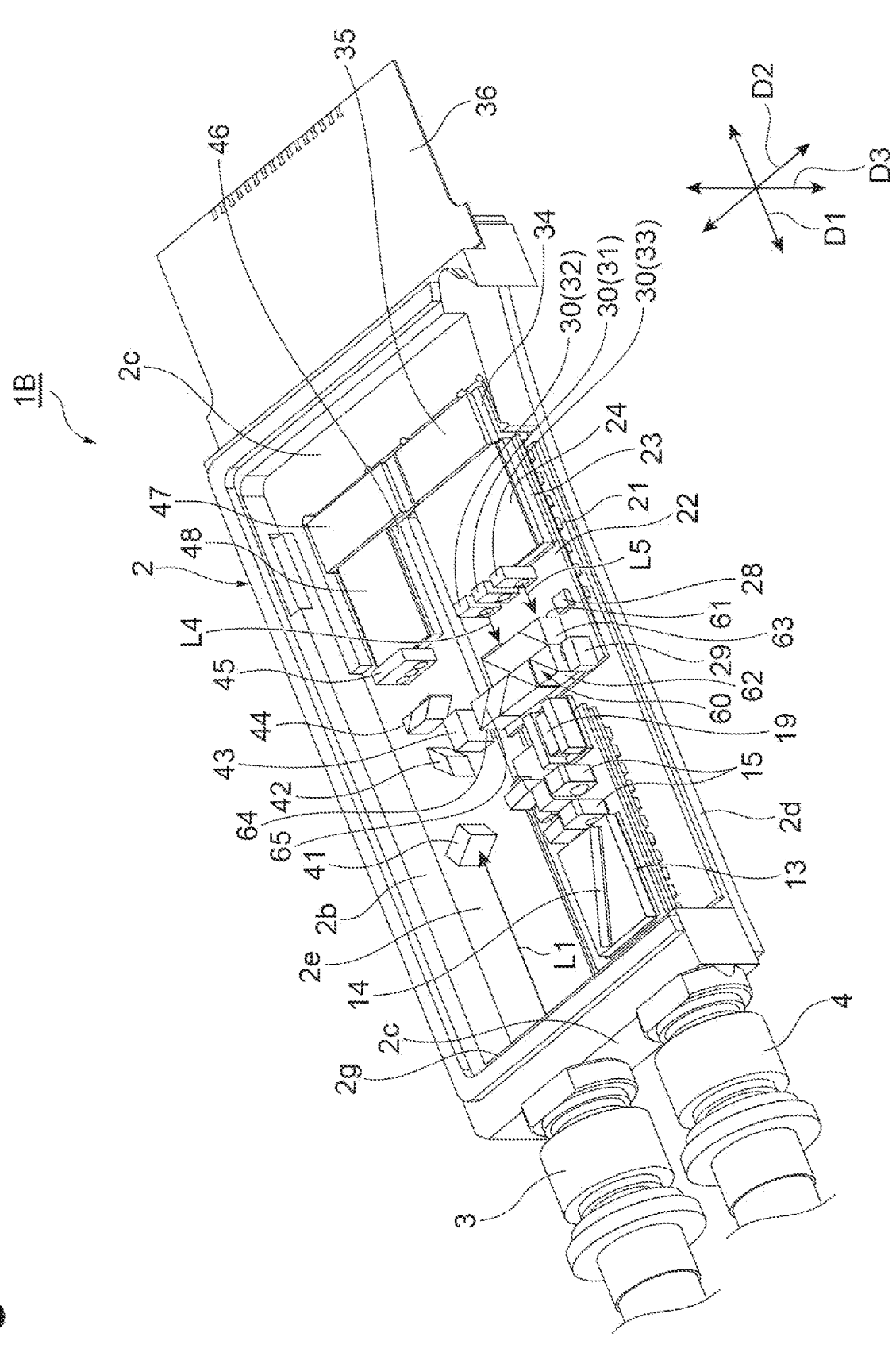
FIG. 4 is a perspective view illustrating an internal structure of an optical module according to a modified example.

Next, an optical module 1B according to a further modified example will be described with reference to FIG. 4. As illustrated in FIG. 4, the optical module 1B includes a composite filter block 60 instead of the filter block 25, the polarization multiplexing filter 26, and the monitor tap filter 27. The composite filter block 60 includes a first outer surface 61 on which the light L4 and the light L5 from the optical modulation element 24 are incident, a second outer surface 62 to which the output light L2 is output, a third outer surface 63 facing the modulated output light intensity monitor light receiving element 29, and a fourth outer surface 64 facing the second optical path adjusting filter 43.

Figure 5:
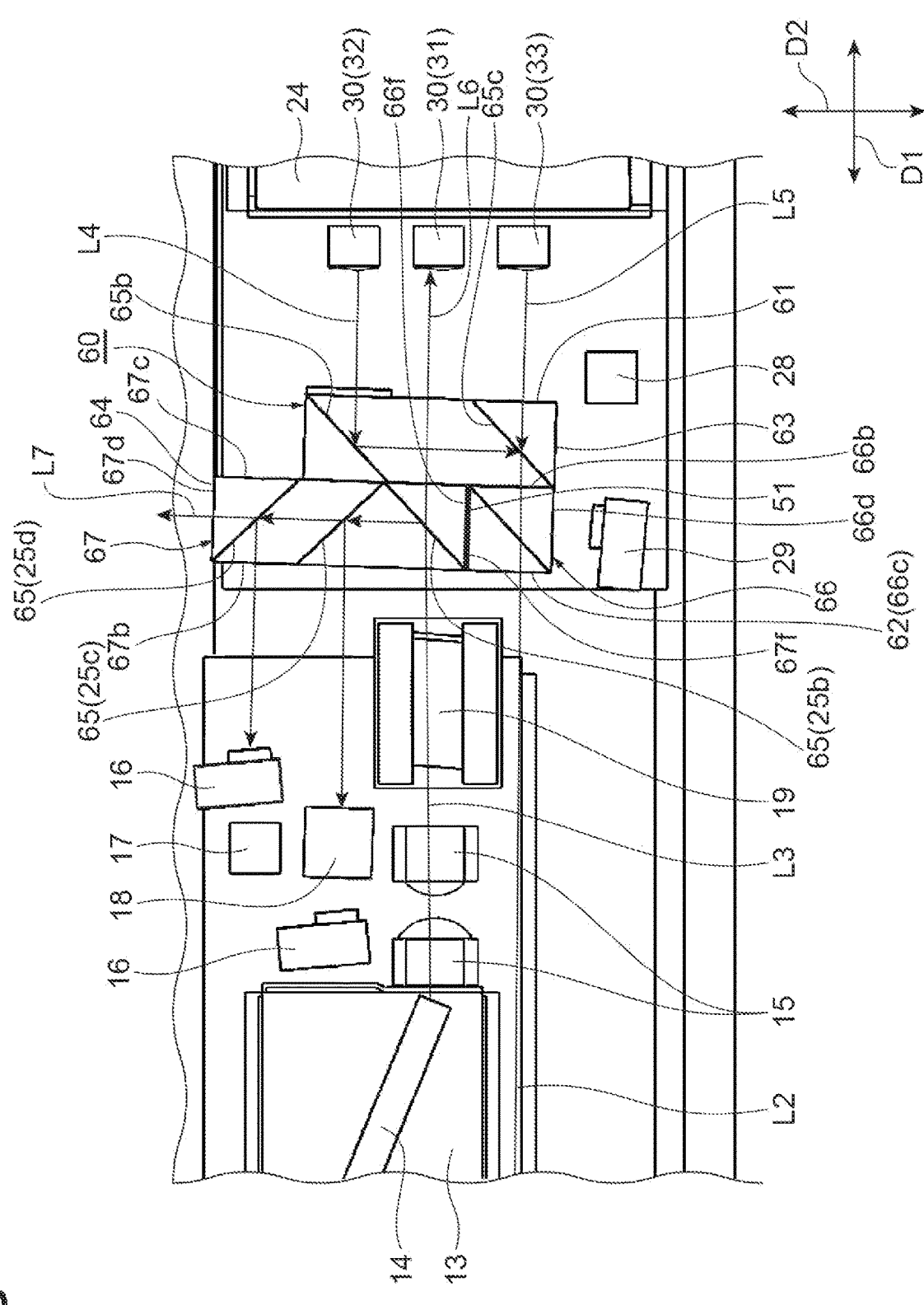
FIG. 5 is an enlarged plan view of a beam splitter and a light receiving unit of the optical module of FIG. 4.

FIG. 5 is an enlarged plan view of the composite filter block 60 of FIG. 4. As illustrated in FIG. 5, the composite filter block 60 has a plurality of inner surfaces 65 within the region defined by the first outer surface 61, the second outer surface 62, the third outer surface 63, and the fourth outer surface 64. The plurality of inner surfaces 65 include, for example, described above, the first reflecting/transmitting surface 25b, the second reflecting/transmitting surface 25c, and the third reflecting/transmitting surface 25d. Furthermore, the plurality of inner surfaces 65 include a reflecting surface 65b reflecting the light L4 in the second direction D2 and a fourth reflecting/transmitting surface 65c reflecting the light L4 and transmitting the light L5. The light reflecting film or the light absorbing film may be attached to the reflecting surface 65b. In addition, the third outer surface 63 may be rough-polished. In this case, it is possible to more reliably suppress the stray light from reaching the modulated output light intensity monitor light receiving element 29.

The composite filter block 60 includes a monitor tap filter unit 66 facing the modulated output light intensity monitor light receiving element 29 in the second direction D2 and a power split filter unit 67 located on the side opposite to the modulated output light intensity monitor light receiving element 29 when viewed from the monitor tap filter unit 66.

The power split filter unit 67 is a portion of the composite filter block 60 having the first reflecting/transmitting surface 25b, the second reflecting/transmitting surface 25c, and the third reflecting/transmitting surface 25d described above. The power split filter unit 67 is another beam splitter different from the monitor tap filter unit 66 (beam splitter). The power split filter unit 67 has a fifth surface 67b into which the light L3 is input, a sixth surface 67c facing the fifth surface 67b, a seventh surface 67d intersecting with the fifth surface 67b, and an eighth surface 67f facing the seventh surface 67d. The aforementioned inner surface 65 is formed within the region defined by the fifth surface 67b, the sixth surface 67c, the seventh surface 67d, and the eighth surface 67f.

The monitor tap filter unit 66 includes a first surface 66b facing the optical modulation element 24 side, a second surface 66c facing the output assembly 4 side, a third surface 66d facing the modulated output light intensity monitor light receiving element 29, and a fourth surface 66f facing the side opposite to the third surface 66d. The composite filter block 60 includes the light absorbing/reflecting unit 51 attached to the fourth surface 66f. The light absorbing/reflecting unit 51 is provided between the monitor tap filter unit 66 and the power split filter unit 67. That is, the power split filter unit 67 is connected to the fourth surface 66*f* of the monitor tap filter unit 66 via the light absorbing/reflecting unit 51 at the eighth surface 67*f*. The power split filter unit 67 splits the light L3, which is a second incident light incident from the fifth surface 67*b*, into third split light L6 transmitted through the inner surface 65 and emitted from the sixth surface 67*c* and fourth split light L7 reflected on the inner surface 65 and emitted from the seventh surface 67*d*.

As described above, in the optical module 1B according to a modified example, the composite filter block 60 includes the light absorbing/reflecting unit 51 provided between the monitor tap filter unit 66 and the power split filter unit 67, and the light absorbing/reflecting unit 51 is attached to the fourth surface 66*f* of the monitor tap filter unit 66. Therefore, even if the stray light is generated from the power split filter unit 67 to the monitor tap filter unit 66, since the stray light is absorbed or reflected by the light absorbing/reflecting unit 51, it is possible to suppress the stray light from reaching the modulated output light intensity monitor light receiving element 29. Therefore, the same functions and effects as those of the optical module 1 described above can be obtained.

Figure 6:
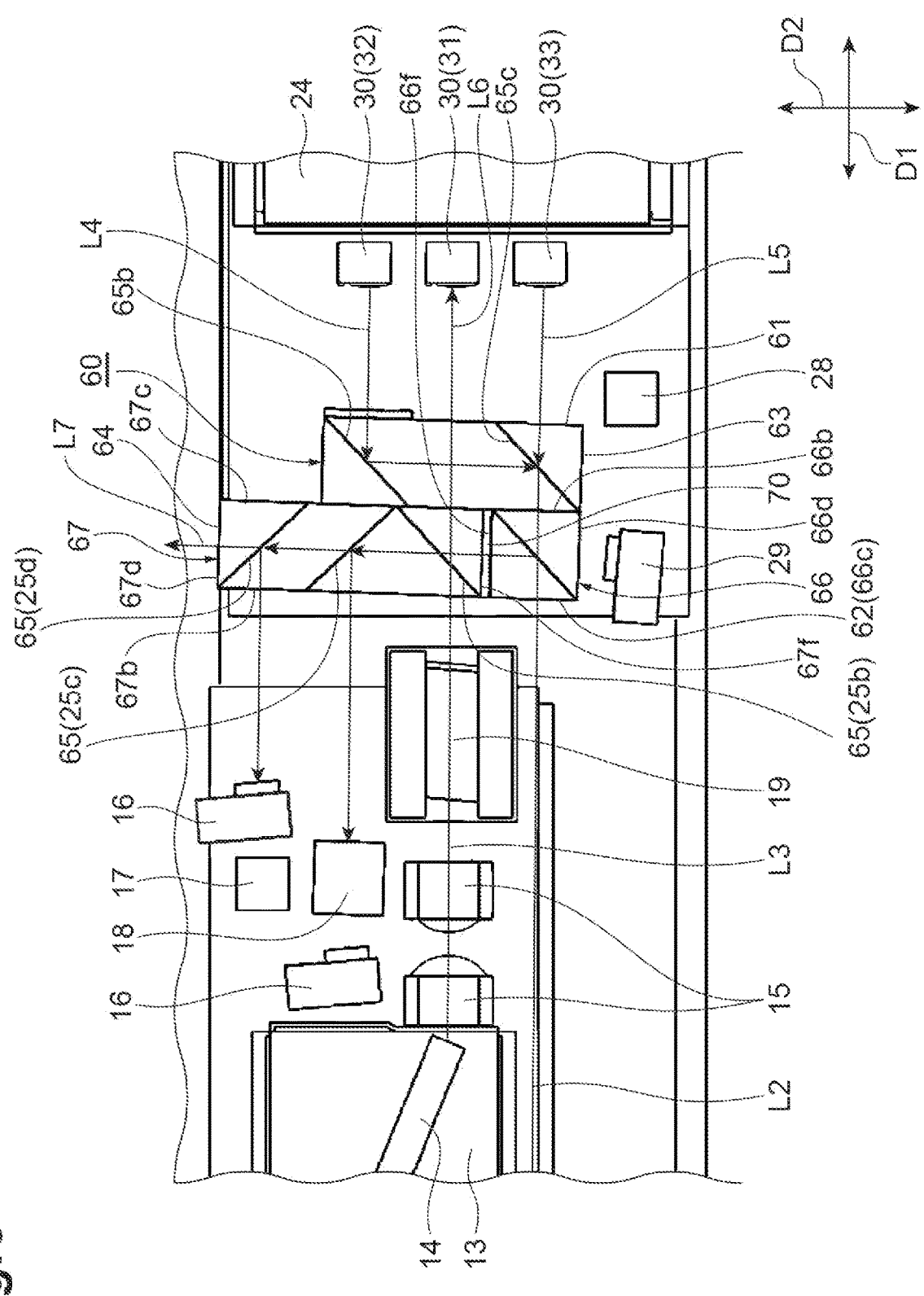
FIG. 6 is a diagram illustrating a further modified example of the beam splitter of FIG. 5.

An optical module according to a further modified example of the optical module 1B will be described with reference to FIG. 6. The optical module illustrated in FIG. 6 is different from the optical module 1B in that the optical module includes a film forming component 70 instead of the light absorbing/reflecting unit 51. The film forming component 70 is, for example, the same as the film forming component 53 described above. The film forming component 70 is attached between the monitor tap filter unit 66 and the power split filter unit 67.

Figure 7:
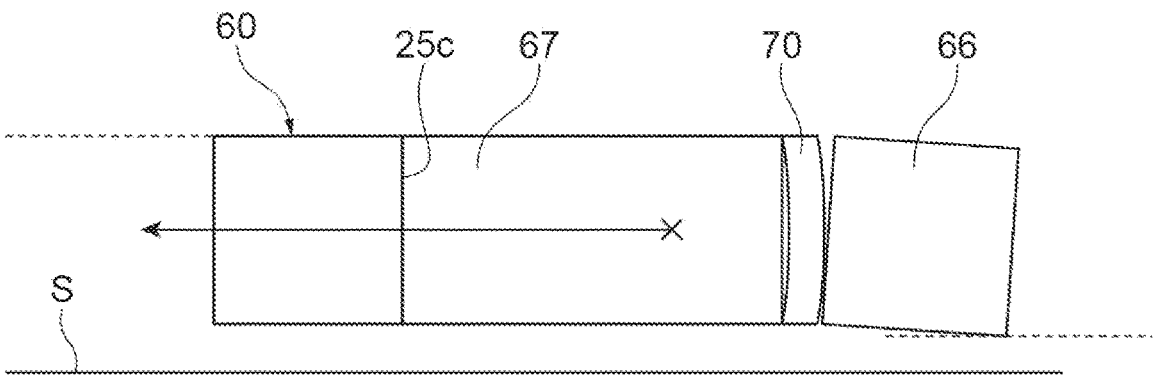
FIG. 7 is a diagram describing mounting of the beam splitter in FIG. 6.

FIG. 7 is a diagram describing attachment of the film forming component 70. As illustrated in FIGS. 6 and 7, the light absorbing film or the light reflecting film is formed, for example, either on the film forming component 70 on a surface of the side of the monitor tap filter unit 66 or on the film forming component 70 on a surface of the side of the power split filter unit 67. During this film formation, there is a possibility that the film forming component 70 may be in a warped state, and the monitor tap filter unit 66 side may be tilted in the third direction D3. Therefore, when the film forming component 70 is fixed to the monitor tap filter unit 66 and the power split filter unit 67 with resin in the state where the monitor tap filter unit 66 is separated from a mounting surface S by a certain distance X, even if the monitor tap filter unit 66 is tilted, it is possible to avoid the monitor tap filter unit 66 from contacting the mounting surface S. The certain distance X is, for example, 20 μm. As described above, in the optical module illustrated in FIG. 7 as well, since the stray light is absorbed or reflected by the film forming component 70, it is possible to suppress the stray light from reaching the modulated output light intensity monitor light receiving element 29.

The embodiments and various modifications of the optical module according to the present disclosure have been described above. However, the invention is not limited to the embodiments or various modifications described above. That is, it is easily recognized by those skilled in the art that the present invention can be modified and changed in various ways without changing the spirit of the claims. For example, the shape, size, number, material, and layout of each component of the optical module are not limited to those described above and can be changed as appropriate.

What is claimed is:

1. An optical module comprising:
a beam splitter having a first surface, a second surface facing the first surface, a third surface intersecting with the first surface, a fourth surface facing the third surface, and an inner surface formed within a region defined by the first surface, the second surface, the third surface, and the fourth surface; and
a light receiving unit arranged at a position facing the third surface of the beam splitter,
wherein the beam splitter splits first incident light incident from the first surface into first split light transmitted through the inner surface and emitted from the second surface and second split light reflected on the inner surface and emitted from the third surface, and
wherein the optical module comprises a light absorbing/reflecting unit, and the fourth surface is coated with the light absorbing/reflecting unit.

2. The optical module according to claim 1,
wherein the light absorbing/reflecting unit is coated with a light absorbing film or a light reflecting film.

3. The optical module according to claim 1, further comprising an optical modulation element,
wherein the optical modulation element is input with continuous light to an input port, and the first incident light is output from an output port as modulated signal light.

4. The optical module according to claim 3,
wherein the light absorbing/reflecting unit absorbs or reflects the continuous light.

5. The optical module according to claim 3, further comprising another beam splitter having a fifth surface, a sixth surface facing the fifth surface, a seventh surface intersecting with the fifth surface, an eighth surface facing the seventh surface, and an inner surface formed within a region defined by the fifth surface, the sixth surface, the seventh surface, and the eighth surface,
wherein the other beam splitter is connected to the fourth surface of the beam splitter via the light absorbing/reflecting unit at the eighth surface and splits the second incident light incident from the fifth surface into third split light transmitted through the inner surface and emitted from the sixth surface and fourth split light reflected on the inner surface and emitted from the seventh surface.

6. An optical module comprising:
an optical modulation element having an input port input with continuous light and an output port outputting modulated signal light;
a beam splitter having a first surface, a second surface facing the first surface, a third surface intersecting with the first surface, a fourth surface facing the third surface, and an inner surface formed within a region defined by the first surface, the second surface, the third surface, and the fourth surface and splitting the modulated signal light incident from the first surface into first split light transmitted through the inner surface and emitted from the second surface and second split light reflected on the inner surface and emitted from the third surface;
a light receiving unit arranged at a position facing the third surface of the beam splitter and receiving the second split light; and
a light absorbing/reflecting unit absorbing or reflecting the continuous light, wherein the fourth surface is coated with the light absorbing/reflecting unit.

7. The optical module according to claim 1,
wherein a light transmittance of the light absorbing/
reflecting unit is less than 0.1%, and a light reflectance
of the light absorbing/reflecting unit is less than 2%.

* * * * *